Feb. 19, 1929.

E. BAUMANN 1,702,717

BORING MACHINE

Filed Feb. 11, 1927

INVENTOR
Emil Baumann
By
Pennie, Davis, Marvin & Edmonds
Attorneys

Patented Feb. 19, 1929.

1,702,717

UNITED STATES PATENT OFFICE.

EMIL BAUMANN, OF WINTERTHUR, SWITZERLAND, ASSIGNOR TO THE FIRM GEBRÜDER SULZER AKTIENGESELLSCHAFT, OF WINTERTHUR, SWITZERLAND.

BORING MACHINE.

Application filed February 11, 1927, Serial No. 167,420, and in Switzerland February 16, 1926.

This invention relates to machine tools, particularly boring machines, and has for its object to provide an improved means for maintaining the tool steady during the operation of boring out long hollow articles.

According to this invention the tool holder is provided with a guide rod or steady mounted to slide within a hollow extension of the tool holder, the arrangement being such that the guide can be lowered at will so that its lower end engages with a socket, either disposed in the machine frame or in the work table. When the socket is formed in the machine frame it will be understood that the guide rod remains stationary, but when the socket is secured to the work table then the guide rotates together with the work. When not required for use the guide rod may be removed into an inoperative position in or on the tool holder, where it may be secured in place, and conveniently such movement may be carried out by the mechanism which also effects the rapid feed of the tool holder.

In the preferred construction the end of the guide rod remote from the tool holder is tapered, and, when in use, fits tightly into a tapered socket, either on the frame of the machine or on the work table. When it is desired to withdraw the rod into an inoperative position it becomes necessary to loosen the tapered end of the rod in its socket, and for this purpose a hydraulic cylinder and ram is provided, the subsequent movement of the rod being effected, as stated above, by the rapid feed mechanism for the tool holder.

Figure 1:
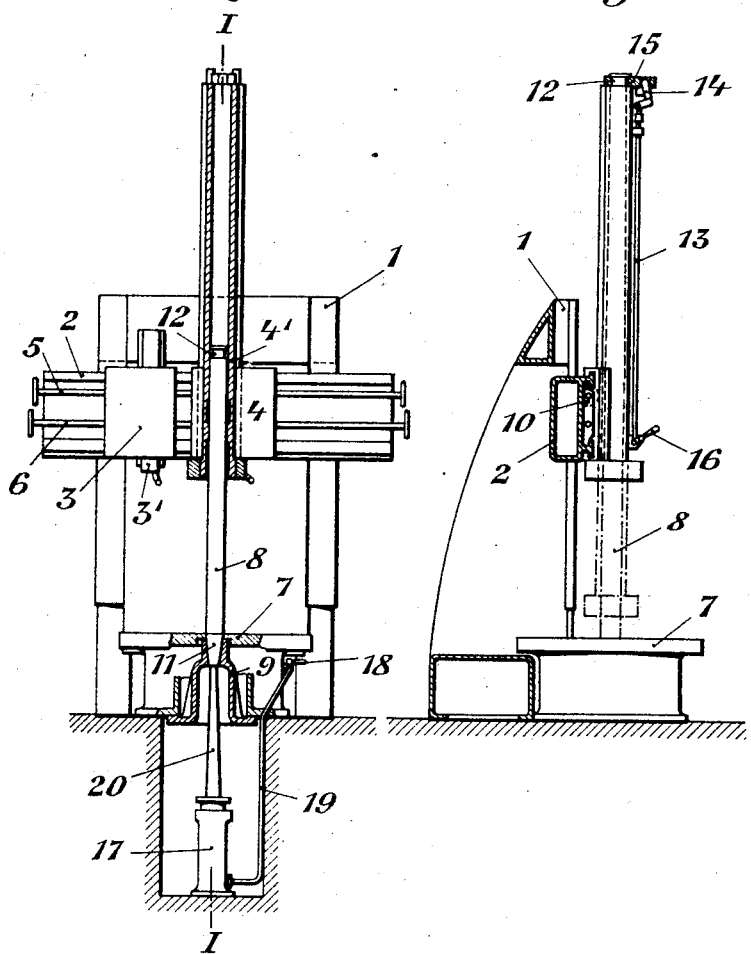
Figure 2:
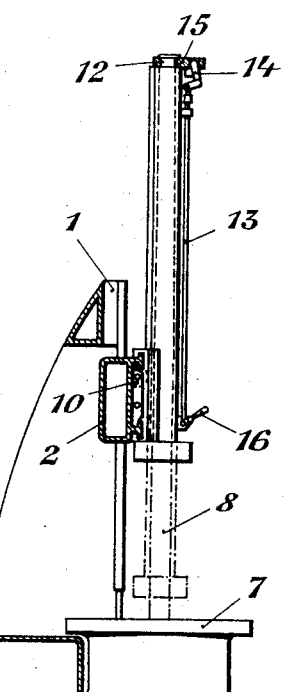
Figure 3:
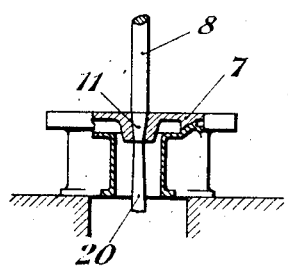

The invention may be carried out in various ways, but two constructions according thereto are illustrated in the accompanying drawings, in which Figure 1 shows in part sectional elevation a boring machine having a guide rod for the tool holder according to the invention, Figure 2 is a section on the line I—I of Figure 1, and Figure 3 illustrates the mounting of the lower end of the guide rod when the latter is adapted to rotate with the work table.

In the construction illustrated in Figures 1 and 2 the machine comprises a frame 1 in which a cross bar 2 is supported in suitable guides. This cross bar carries tool slides 3 and 4 in which are mounted tool holders 3' and 4' respectively, of which the tool holder 3' is of known form, whilst 4' is formed in accordance with the invention. The lateral movement of these tool holders is brought about by means of the actuating spindles 5 and 6 and the vertical movement of the tool holder 4' is effected by means of a worm 10. At the base of the frame 1 is mounted the work table operated in the known manner by mechanism not shown in the drawing.

The tool holder 4' is provided with a vertical extension in the form of a tube within which is movably mounted a steady or guide 8 in the form of a rod for supporting the tool holder 4', the other end of this rod being tapered and adapted to engage with an internally tapered socket 9 carried by the framework of the machine and serving to centre the rod.

The rod 8 when in its lowermost position serves to steady the tool holder 4' during the operation of boring out the interior of long hollow articles, but when the work is being set up, or when the work is of such a nature that support of the tool holder is unnecessary, then the rod may be withdrawn into an inoperative position and secured there. In order to loosen the end of the rod in its socket 9 preparatory to such withdrawal a hydraulic cylinder 17 is provided, to which the pressure-creating fluid is supplied through a pipe 19 controlled by means of a valve 18. The initial upward movement of the guide rod 8 is effected by means of the ram 20, subsequent movement being brought about by the rapid feed mechanism for the tool holder 4'.

The guide rod 8 is secured in its uppermost position by means of a catch 15 engaging with a circumferential groove 12 in the guide rod (Figure 2), this catch being actuated through a connecting rod 13 and bell crank lever 14 by means of a hand lever 16. When thus secured in its upper position the rod 8 is entirely withdrawn inside the tubular extension of the tool holder 4'.

Lifting of the guide rod 8 by means of the rapid reversing gear of the tool holder is performed by lowering the tool holder until the pawl 15 engages in the groove 12 of the rod 8 previously released by the ram 20, whereafter, the tool holder together with the guide rod can be lifted by means of the rapid reversing gear of the machine.

In the alternative construction illustrated in Figure 3 the lower end of the guide rod, instead of being supported in a fixed socket, is mounted to rotate with the work and the socket is formed integral with the work table. As before a hydraulic cylinder and ram are provided for loosening the rod in its socket when required, the remainder of the machine being constructed in the same way as that illustrated in Figures 1 and 2.

It will be appreciated that with the construction according to the invention efficient means are provided for maintaining the tool steady and that the machine is therefore particularly suitable for the manufacture of hollow articles having long or deep bores.

It is to be understood that although the device according to the invention is particularly applicable for use with a vertical boring machine and is actually illustrated as applied in this way, it may equally well be used with horizontal machines.

What I claim is:—

In a turning and boring mill the combination with a non-rotary tool holder having a hollow extension, of a guide rod adapted to slide within said extension, a socket bearing adapted to engage with the free end of said guide rod, means for withdrawing said guide rod from said socket and moving it to an inoperative position within said hollow extension, and means arranged at one end of said extension adapted to lock said guide rod in said inoperative position.

In testimony whereof I have affixed my signature.

EMIL BAUMANN.